US009995929B2

(12) United States Patent
Favero et al.

(10) Patent No.: US 9,995,929 B2
(45) Date of Patent: Jun. 12, 2018

(54) METHOD FOR TUNING ONE OR MORE RESONATOR(S)

(71) Applicants: Universite Paris Diderot Paris 7, Paris (FR); Centre National de la Recherche Scientifique (CNRS), Paris (FR)

(72) Inventors: Ivan Favero, Paris (FR); Christopher Baker, Paris (FR); Eduardo Gil Santos, Paris (FR)

(73) Assignees: Universite Paris Diderot Paris 7 (FR); Centre National de la Recherche Scientifique (CNRS) (FR)

( * ) Notice: Subject to any disclaimer, the term of this patent is extended or adjusted under 35 U.S.C. 154(b) by 0 days. days.

(21) Appl. No.: 15/557,950

(22) PCT Filed: Mar. 4, 2016

(86) PCT No.: PCT/EP2016/054704
§ 371 (c)(1),
(2) Date: Sep. 13, 2017

(87) PCT Pub. No.: WO2016/146409
PCT Pub. Date: Sep. 22, 2016

(65) Prior Publication Data
US 2018/0059412 A1 Mar. 1, 2018

(30) Foreign Application Priority Data
Mar. 13, 2015 (EP) .................................... 15290070

(51) Int. Cl.
*G02B 6/293* (2006.01)
*G02B 6/136* (2006.01)
(Continued)

(52) U.S. Cl.
CPC ....... *G02B 27/0012* (2013.01); *G02B 5/1857* (2013.01); *G02B 6/12007* (2013.01);
(Continued)

(58) Field of Classification Search
CPC ............. G02B 6/136; G02B 6/29338–6/29343
See application file for complete search history.

(56) References Cited

U.S. PATENT DOCUMENTS

| 6,884,740 B2 * | 4/2005 | Hu .................... H01L 21/30635 216/103 |
| 2014/0321502 A1 | 10/2014 | Ahmed et al. |
| 2015/0170901 A1 * | 6/2015 | Motayed ............. H01L 21/0259 438/478 |

FOREIGN PATENT DOCUMENTS

| EP | 1585087 A1 | 10/2005 |
| WO | 0225338 A2 | 3/2002 |

OTHER PUBLICATIONS

Aharonovich Igor et al: "Controlled tuning of whispering gallery modes of GaN/InGaN microdisk cavities", Applied Physics Letters, American Institute of Physics, vol. 1.99 , No. 11, Sep. 12, 2011 (Sep. 12, 2011) , p. 111111, XP012151336.
(Continued)

*Primary Examiner* — Jerry Rahll
(74) *Attorney, Agent, or Firm* — Lerner, David, Littenberg, Krumholz & Mentlik, LLP

(57) ABSTRACT

The invention concerns a method for tuning at a targeted resonance wavelength at least one micro and/or nanophotonic resonator, the resonator having dimensions defining resonance wavelength of said resonator, the resonator being immersed in a fluid containing ions so that the resonator is surrounded by said fluid, wherein the method comprises a step of injecting light, having a light wavelength equal to the resonance wavelength, into the resonator, so that the injected light resonates within the resonator and triggers a photo-
(Continued)

electrochemical etching process enabled by the surrounding fluid containing ions, said etching process being enhanced by the optical resonance which amplifies light intensity in the photonic resonator, the etching decreasing dimensions of the photonic resonator, hereby lowering and tuning the resonance wavelength of the photonic resonator.

24 Claims, 9 Drawing Sheets

(51) Int. Cl.
    *G02B 27/00*     (2006.01)
    *G02B 5/18*     (2006.01)
    *G02B 6/12*     (2006.01)
    *G02B 5/28*     (2006.01)
    *G02B 1/00*     (2006.01)

(52) U.S. Cl.
    CPC .............. *G02B 6/136* (2013.01); *G02B 1/005* (2013.01); *G02B 5/28* (2013.01); *G02B 6/29338* (2013.01)

(56) References Cited

OTHER PUBLICATIONS

D. Sridharan, E. Waks, G. Solomon, and J. T. Fourkas, "Reversible tuning of photonic crystal cavities using photochromic thin films", Applied Physics Letters, vol. 96, No. 15, p. 153303, Apr. 2010.

Haberer E. et al: "Removal of thick (>100nm) InGaN layers for optical devices using band-gap-selective photoelectrochemical etching", Applied Physics Letters, American Institute of Physics, vo 1. 85, No. 5, Jan. 1, 2004 (Jan. 1, 2004), pp. 762-764, XP012064099.

International Search Report for Application No. PCT/EP2016/054704 dated Jun. 13, 2016, 3 pages.

K. A. Piegdon et al., "All-optical tunability of microdisk lasers via photoadressable polyelectrolyte functionalization", Optics express, vol. 20, No. 6, pp. 6060-6067, Feb. 29, 2012.

K. Srinivasan and O. Painter, "Optical fiber taper coupling and high resolution wavelength tuning of microdisk resonators at cryogenic temperatures", Applied Physics Letters, vol. 90, No. 3, p. 031114, Jan. 2007.

M. Shainline, G. Fernandes, Z. Liu, and J. Xu, "Broad tuning of whispering-gallery modes in silicon microdisks", Optics express, vol. 18, No. 14, pp. 14345-14352, Jun. 21, 2010.

M. Zhang et al., "Synchronization of micromechanical oscillators using light", Physical Review Letters, vol. 109, No. 23, p. 233906, Dec. 5, 2012.

Niu Nan et al: "A full free spectral range tuning of p-i-n doped gallium nitride microdisk cavity", Applied Physics Letters, American Institute of Physics, vol. 101, No. 16, Oct. 2012 (Oct. 15, 2012), pp. 161105-161105, XP012165326.

P. Dong et al., "Thermally tunable silicon racetrack resonators with ultralow tuning power," Optics Express, vol. 18, No. 19, pp. 20298-20304, Sep. 8, 2010.

W. von Klitzing et al., "Frequency tuning of the whispering-gallery modes of silica Microspheres for cavity quantum electro-dynamics and spectroscopy", Optics letters, vol. 26, No. 3, pp. 166-168, Feb. 2001.

Y. Shen et al., "Electric-field-driven nano-oxidation trimming of silicon microrings and interferometers", Optics Letters, vol. 36, No. 14, pp. 2668-2670, Jul. 15, 2011.

* cited by examiner

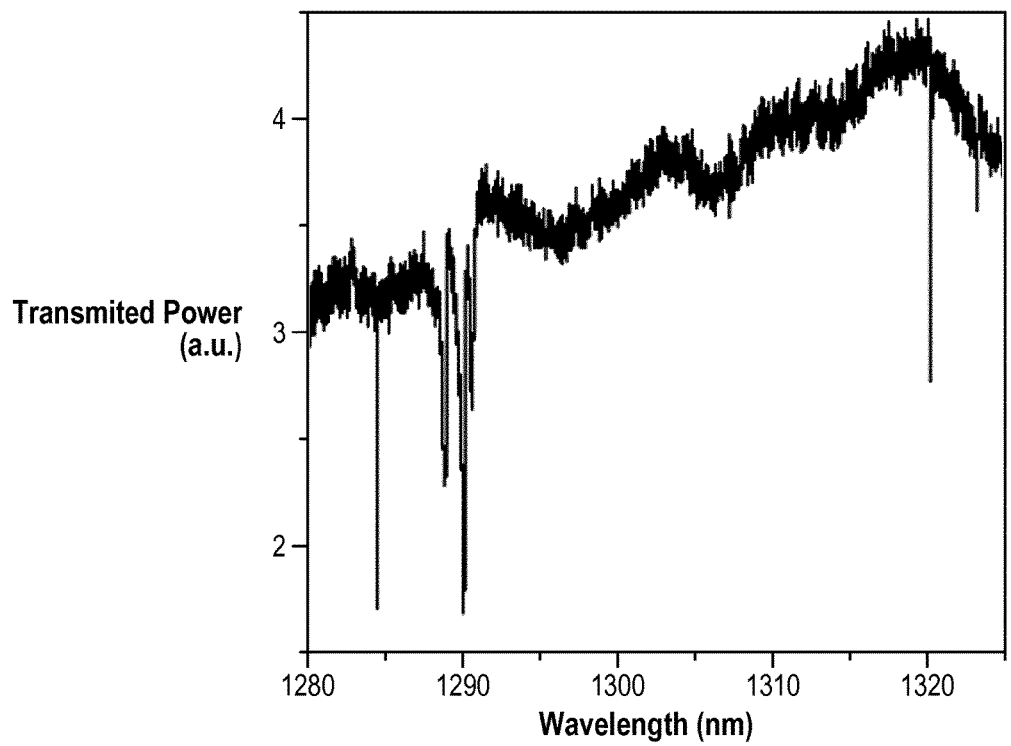
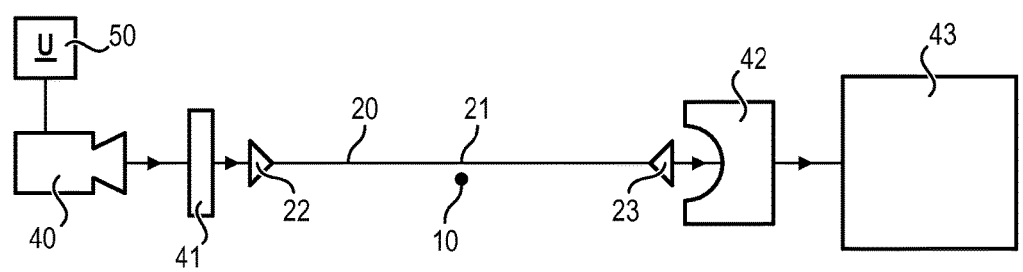

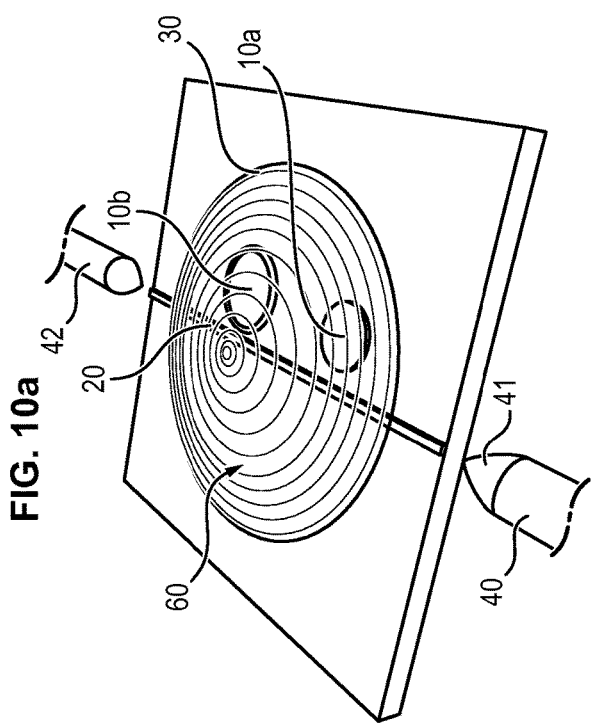
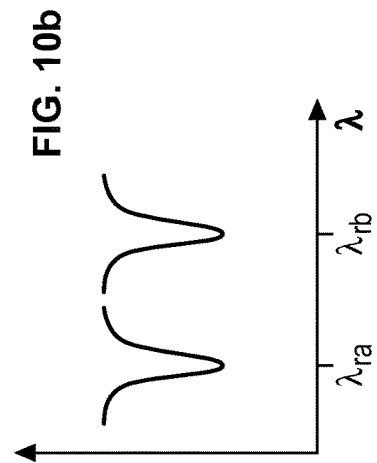
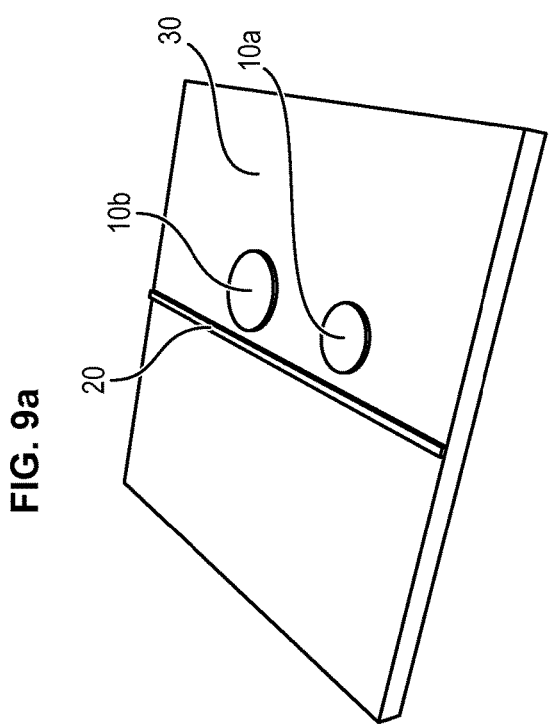
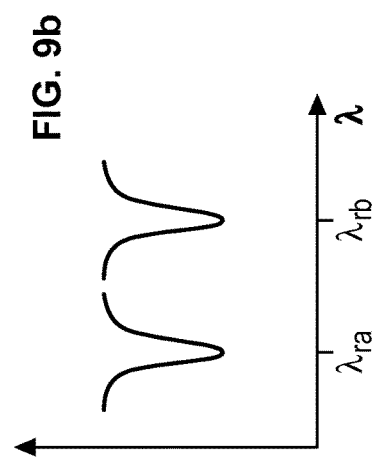

METHOD FOR TUNING ONE OR MORE RESONATOR(S)

CROSS REFERENCE TO RELATED APPLICATIONS

The present application is a national phase entry under 35 U.S.C. § 371 of International Application No. PCT/EP2016/054704 filed Mar. 4, 2016, published in English, which claims priority from European Patent Application No. 15290070.0 filed Mar. 13, 2015, the disclosures of which are incorporated herein by reference.

FIELD OF THE INVENTION

The invention relates to the field of micro- and nano-photonic resonators and in particular to the tuning of such resonators to a desired wavelength.

Optical resonators, which are part of a photonic device, generally consist in a cavity in which light can enter and resonate, hereby amplifying the signal.

PRIOR ART

Micro- and nanoresonators are small devices, which are difficult to build with a high precision. Industrials have developed clean room fabrication techniques (such as photolithography and plasma etching) that typically result in a precision no better than a few nanometers. These reproducibility constraints due to the manufacturing-related imprecisions ultimately affect the ultimate resonance wavelength of the fabricated optical resonators.

As a result, fabricating several high Q, wavelength-sized optical resonators sharing exactly the same resonance wavelength is not currently achievable, even through state-of-the art fabrication means.

Those resonators have several applications, either in academic research or in industrial development for improved technology.

Light-matter interaction (lasers, cavity electrodynamics, optomechanics, non-linear optics, . . . ) is a major topic of current research. Obtaining optical resonators with precise resonance frequencies, which can couple to given atomic transitions or molecular excitations is of interest. Moreover, arrays of resonators and their collective behavior are also a subject of interest.

Miniaturized optical resonators are currently the focus of important research and development, with applications in optical delays, optical routing with micro-nanoscale devices, photonic force and gas sensing, optical gyroscopes, Silicon On Insulator optical devices, semiconductor lasers, optical computers, optical metamaterials.

Resonators can be also used as:
Sensors, as shown in document US 2014/03211502, where acquiring the wavelength of the resonator enables to obtain the temperature. In this case, the best the resonance wavelength control, the more accurate the obtained temperature value,
Display devices, as show in document EP 1 585 087, where light is guided in a plane comprising fluorophores which reemit light when excited. As fluorophores are highly selective optically, the resonance wavelength must be well known,
Transistors for logical connections in order to achieve photonic bits process for optical computers. The development of such computers where information is transmitted through photons instead of electrons is accelerating in the silicon industry.

Several techniques have been developed in the past years in order to tune and control the resonance of the resonators. We present below an exhaustive overview of the state of art:
K. Srinivasan and O. Painter, "Optical fiber taper coupling and high resolution wavelength tuning of microdisk resonators at cryogenic temperatures", *Applied physics letters*, vol. 90, no. 3, p. 031114, 2007.
In this document, nitrogen is deposited on the optical resonator to shift its resonance wavelength.
Such a technique is non-permanent and requires the sample to be in high-vacuum and at cryogenic temperature.
Reversible tuning of photonic crystal cavities using photochromic thin films. D. Sridharan, E. Waks, G. Solomon, and J. T. Fourkas, "Reversible tuning of photonic crystal cavities using photochromic thin films", *Applied Physics Letters*, vol. 96, no. 15, p. 153303, 2010.
In this document, a thin photochromic layer is deposited on the resonator.
This technique has a limited tuning range, the layer can degrade optical and mechanical properties of the device, and is non-applicable for a plurality of resonators.
M. Shainline, G. Fernandes, Z. Liu, and J. Xu, "Broad tuning of whispering-gallery modes in silicon microdisks", *Optics express*, vol. 18, no. 14, pp. 14345-14352, 2010.
In this document, a tension is applied to the optical resonator, thereby changing its refractive index (through the electro-optic effect) and thus its resonance frequency.
Such a technique requires electric tuning with metallic electrodes in contact with the resonator, which degrade the optical properties and is non-scalable.
K. Piegdon, M. Lexow, G. Grundmeier, H.-S. Kitzerow, K. Parschke, D. Mergel, D. Reuter, A. Wieck, and C. Meier, "All-optical tenability of microdisk lasers via photo-addressable polyelectrolyte functionalization", *Optics express*, vol. 20, no. 6, pp. 6060-6067, 2012.
In this document, the technique is applied to the whole sample, therefore showing a lack of selectivity. The precision is of the order of nanometers and the reproducibility has not been achieved.
W. von Klitzing, R. Long, V. S. Ilchenko, J. Hare, and V. Lefevre-Seguin, "Frequency tuning of the whispering-gallery modes of silica microspheres for cavity quantum electro-dynamics and spectroscopy", *Optics letters*, vol. 26, no. 3, pp. 166-168, 2001.
In this document, a mechanical action is exerted on the resonator, consisting in compressing and stretching a microsphere.
Such a technique is non-scalable and non-compatible with micro- and nano-photonic devices, is non-permanent and is technically impractical.
N. Niu, T.-L. Liu, I. Aharonovich, K. J. Russell, A. Woolf, T. C. Sadler, H. A. El-Ella, M. J. Kappers, R. A. Oliver, and E. L. Hu, "A full free spectral range tuning of pin doped gallium nitride microdisk cavity", *Applied Physics Letters*, vol. 101, no. 16, p. 161105, 2012.
In this document, the whole sample containing resonators is tuned with photoelectrical etching by UV light. The UV light is absorbed by the whole sample. Such a technique lacks spectral precision, is not site-specific, is non-scalable to a large number of resonators, and does not allow real time in-situ monitoring of the resonance wavelength.

Y. Shen, I. B. Divliansky, D. N. Basov, and S. Mookherjea, "Electric-field-driven nano-oxidation trimming of silicon microrings and interferometers", *Optics letters*, vol. 36, no. 14, pp. 2668-2670, 2011.

In this document, oxidation through peak effect is applied, which changes the resonance wavelength of the resonator through refractive index changes in the resonator material.

Such a technique is slow, non-scalable to arrays of resonators, and has not been proven to be applicable to nano-resonators with the same accuracy.

M. Zhang, G. S. Wiederhecker, S. Manipatruni, A. Barnard, P. McEuen and M. Lipson, "Synchronization of micromechanical oscillators using light", *Physical review letters*, vol. 109, no. 23, p. 233906, 2012.

In this document, a laser light is used to heat a resonator to change its resonance wavelength.

Such a technique is non-permanent, non-scalable to large numbers of resonators, and complex, involving several feedback loops.

P. Dong, W. Qian, H. Liang, R. Shafiiha, D. Feng, G. Li, J. E. Cunningham, A. V. Krishnamoorthy, and M. Asghari, "Thermally tunable silicon racetrack resonators with ultralow tuning power," *Optics express*, vol. 18, no. 19, pp. 20298-20304, 2010.

In this document, the resonator is thermo-electrically tuned.

Such a technique is non-permanent and has only been demonstrated on micro-resonators.

No one of the cited papers disclose an efficient technique which would be permanent, scalable, addressable, site-specific, and accurate at different orders of magnitude.

But all the above-mentioned applications require a cost-effective, precise and simple technique to:
  Tune a single optical resonator to a targeted wavelength,
  Tune multiple resonators to a common targeted wavelength.

SUMMARY OF THE INVENTION

It is an object of the invention to propose an improved method for tuning a resonator at a targeted resonance wavelength at least one micro and/or nanophotonic resonator, the resonator having dimensions defining resonance wavelength of said resonator, the resonator being immersed in a fluid containing ions so that the resonator is surrounded by said fluid, wherein the method comprises a step of injecting light, having a light wavelength equal to the resonance wavelength, into the resonator, so that the injected light resonates within the resonator and triggers a photo-electrochemical etching process enabled by the surrounding fluid containing ions, said etching process being enhanced by the optical resonance which amplifies light intensity in the photonic resonator, the etching decreasing dimensions of the photonic resonator, hereby lowering and tuning the resonance wavelength of the photonic resonator.

The method of the invention may comprise the following features in combination or not. The photonic resonator has a bandgap wavelength set by its constitutive material and the wavelength of the injected light is above the resonator bandgap wavelength.

The injected light is monochromatic.
The method comprises the steps of:
  Starting the step of injecting the light,
  Adjusting the light wavelength of the injected light so as to attain the resonance wavelength of the resonator,
  Lowering the light wavelength so as to follow the resonance wavelength during the etching process until a targeted resonance wavelength is reached,
  Stopping the light injection at the targeted resonance wavelength.

The tuning procedure consists in lowering the resonance wavelength of the photonic resonator by consecutive sweeps, each sweep consisting in sweeping the light wavelength of the injected light between values which comprise the resonance wavelength of the photonic resonator.

The step of injecting light is realized by far-field or near-field optical coupling technique, and where light is injected into one or several resonators.

The step of injecting light is implemented by a waveguide which is on a substrate onto which the photonic resonator is positioned, the waveguide being in the vicinity of the photonic resonator in order to allow near-field optical coupling between the two, the light wavelength of the injected light being larger than a material bandgap wavelength.

The light wavelength of the injected light is comprised amongst visible and infrared spectrum.

The coupling between the photonic resonator and the waveguide is achieved by evanescent waves.

The fluid is a liquid containing ions.

The fluid can be ambient air or a controlled humid atmosphere. In these cases, the photo-assisted etching becomes slower and the precision of the tuning can be made larger.

The method presented here allows for three orders of magnitude higher precision, both in controlling the effective optical device size and in its spectral resonance, reaching picometer precision for these two aspects.

The method is applicable to an industrial setting: it is permanent, scalable and fast, requires little equipment.

The permanence of the tuning is a major advantage for an industrial application, and the method allows for a broad range of wavelength tuning, from picometers to hundreds of nanometers.

Over the prior art, moreover the method does not require any additional component on the photonic device (polymer coating, electrical connects, thermal controls, as explained before), making it simple and non-degrading.

The surrounding fluid can easily be removed after the tuning step without damaging the characteristics of the resonator.

According to a second aspect, the method of the invention allows tuning several resonators, each one having a different resonance wavelength. In that case, this method comprises the following steps:
  Setting a light wavelength of the injected light to a value larger than the resonance wavelength of either resonator,
  Lowering light wavelength of the injected light so as to attain a first resonance wavelength of a first photonic resonator and start the etching process, while a second photonic resonator having a second resonance wavelength inferior to the first resonance wavelength remains intact,
  Lowering light wavelength of the injected light so as to follow the first resonance wavelength, which decreases until the first resonance wavelength of the first photonic resonator that is being etched overlaps with the resonance of the second photonic resonator, the photonic resonators being hereby tuned.

The method according to the second aspect may comprise:
- the step of lowering light wavelength so as to etch both photonic resonators at the same time and the same rate, such that both photonic resonators can be tuned at a common targeted resonance wavelength value and have the same dimensions and optical resonance wavelength;
- the repetition of the step of lowering light wavelength, so as to tune all the resonators at a common targeted resonance wavelength value.

This method is thus scalable to a large number of photonic devices and still requires a single tuning step and a short amount of time (order of the minute), therefore overwhelming the drawbacks of the prior art.

The fact that the tuning step automatically etches the photonic devices of largest size, and then automatically etches all the cavities of identical size at identical speed, provides a fast tuning mechanism and does not require the one-by-one identification of the numerous resonators involved in a collective architecture.

Indeed, the spectral misalignment that arises in arrays of nominally identical photonic resonator due to fabrication variability is solved by the method.

According to a third aspect, the invention concerns a photonic device comprising at least one micro and/or nano-photonic resonator (10) on the substrate (30), obtainable by a method according to the first aspect or the second aspect of the invention.

The photonic device may be tuned with a physical precision of dimensions of the photonic resonator less than 10 pm.

The photonic device may be tuned at the same value with a physical precision of dimensions of the photonic resonators less than 10 pm.

The photonic device may comprise a waveguide which enables transmission of the light to each photonic resonator, by being on the substrate in the vicinity of the at least one resonator.

Each photonic resonator is a disk, a photonic crystal resonator, a ring or racetrack resonator, a Bragg resonator, a distributed feedback grating resonator, a Fabry-Perot resonator or a plasmonic resonator.

The photonic resonator, the substrate and the waveguide are made of GaAs, Silicon, and/or any other semi-conductor and dielectric material where photoelectrochemical etching operates.

DRAWINGS

Other features, embodiments, aim and advantages of the invention will be pointed out in the following specification, which is illustrative and non-limitative, that shall be read in view of the drawing, on which:

FIG. 1 shows a disk resonator to which the method of the invention can be applied, FIG. 2 shows a finite element simulation showing the distribution of the electric field inside the disk, FIG. 3 shows a spectrum of the resonance doublet of the disk resonator of FIG. 1, FIG. 4 shows a set-up adapted for a method according to the invention, FIG. 5 shows a plurality of resonators fed by a plurality of waveguides, FIG. 6 shows a droplet covering the plurality of resonators and waveguides. In this figure, each waveguide is coupled to three distinct resonators, FIG. 7 shows the step of a method according to the invention, FIG. 8 shows the step of another method according to the invention, FIG. 9a, 9b, 10a, 10b, 11a, 11b illustrate different steps of a method according to the invention. The curves represent the optical transmission of the system formed by a waveguide coupled to two resonators, as a function of the wavelength, FIG. 12 shows the spectrum for three resonators tuned with a method according to the invention, FIG. 13 shows the evolution of the resonance wavelength of the three resonators of FIG. 12, at different steps of the method.

DETAILED DESCRIPTION

In order to give a detailed view of the method, the specification will be based on a special type of resonator. This shall not be limitative, in so far as the method can be applied to any optical resonator. By resonator, it is meant any kind, or any shape, or any material that would enable a photonic resonance and the confinement of light in a given volume.

The Photonic Device

Figure 1:
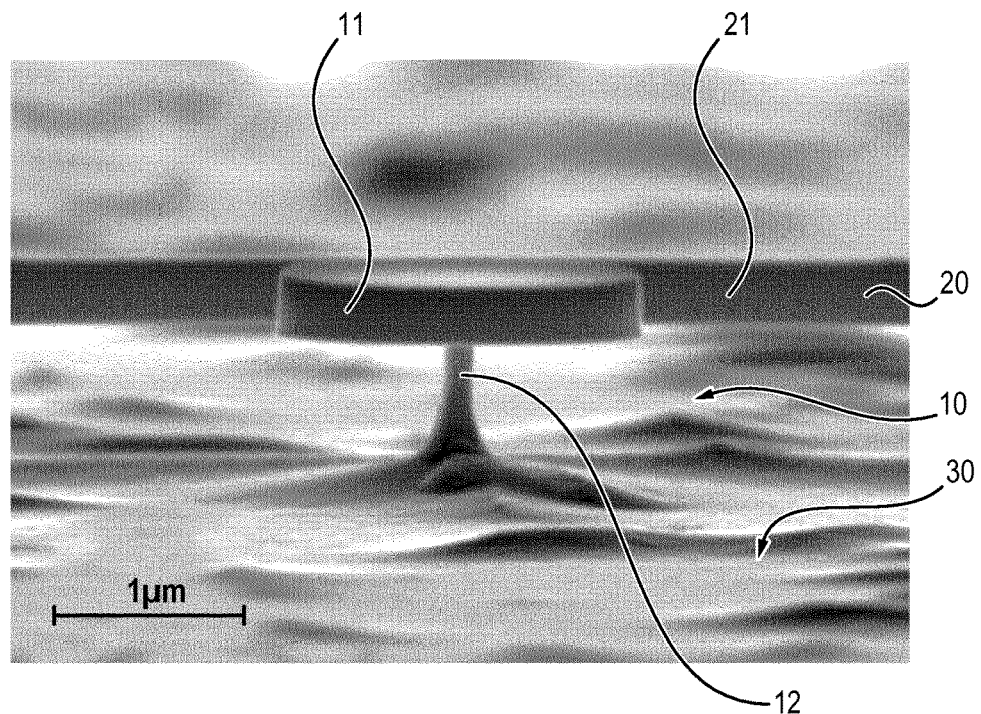

The nano- or micro-photonic resonant cavities, or photonic resonators 10, hereby referred as the resonator 10, employed here for proof of principle experiments consist of disks 11 (see FIG. 1), made from a semi-conductor such as Gallium Arsenide (GaAs). A disk is typically micrometer-sized in lateral dimensions and few hundreds of nanometers thick. The resonator 10 is coupled to an integrated optical waveguide 20, whose central region 21 is tapered in the vicinity of the resonator 10 to allow optical coupling. Typically, and not only in the disk case, said coupling is achieved by evanescent waves. The waveguide 20 enables transmission of the light from an external light source to the resonator 10.

For instance, the distance between the waveguide 20 and the disk 11 is between 100 to 800 nm (hundred to eight hundred nanometers).

An Aluminium Gallium Arsenide pedestal 12 isolates the disk 11 from a sample substrate 30 onto which the waveguide 20 is positioned.

Resonators 10, waveguides 20 and the substrate 30 will be referred as the photonic device.

The photonic resonator 10 has an energy bandgap set by its constitutive material. A bandgap wavelength lambda_B is associated to said bandgap set. Light whose energy is below the energy bandgap is generally not absorbed. In the present case of GaAs, the bandgap wavelength lambda_B is around 870 nm, and GaAs becomes transparent to wavelengths above that.

Figure 2:
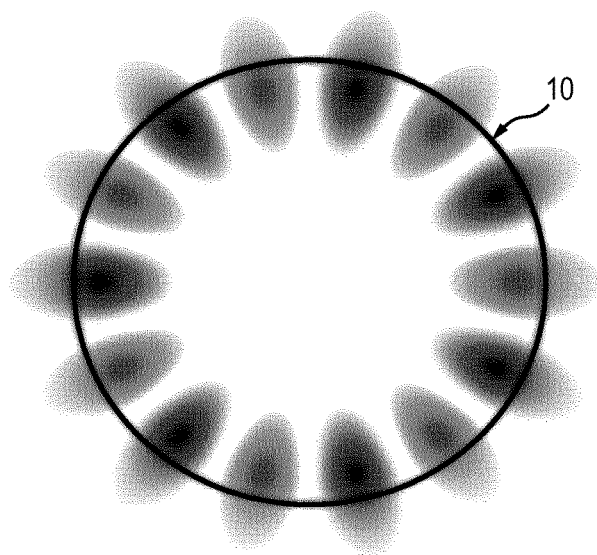

The GaAs disk 11 supports high quality optical Whispering Gallery Modes (WGMs), which correspond to a type of wave that can travel around a concave surface (see FIG. 2). As shown in FIG. 3, the resonance associated to WGMs appear as dips in an optical spectrum. Such disk resonator 10 typically presents an optical resonance doublet. For clarity reasons in the description, this doublet will sometimes be considered as a single resonance value $\lambda r$.

One major criterion for a resonator is its quality factor Q, which can be defined as:

$$Q = \frac{\lambda_r}{\Delta\lambda}$$

Where $\lambda r$ is a resonance wavelength of the resonator and $\Delta\lambda$ is the mode resonance full width at half maximum (FWHM). The higher the Q, the narrower the dip in the spectrum.

Installation Set-Up

Light at a wavelength $\lambda$ is injected into the resonator through the waveguide 20 by a laser source 40. Wavelength $\lambda$ is variable and the laser source 40 delivers preferably monochromatic light.

The optical spectroscopy of the resonator 10 and waveguide 20 is performed in the present case in the 1260-1350 nanometers wavelength range (infrared) using the laser source 40 which is in the present case a continuous wave external cavity diode laser. The beam of laser light is focused onto the coupling waveguide input facet 22 using a microlensed fiber 41. Output light at the waveguide output facet 23 is collected by a microscope objective 42 and sent on a photodetector 43 (see path on FIG. 4).

For example, as shown in FIG. 3, when scanning the laser wavelength, the several dips appearing in the transmission spectrum correspond to the WGMs of the disk 11 of the resonator 10. Linewidths are about 20 to 50 pm. The optical quality factor Q is about 70 000 to 25000.

Figure 5:
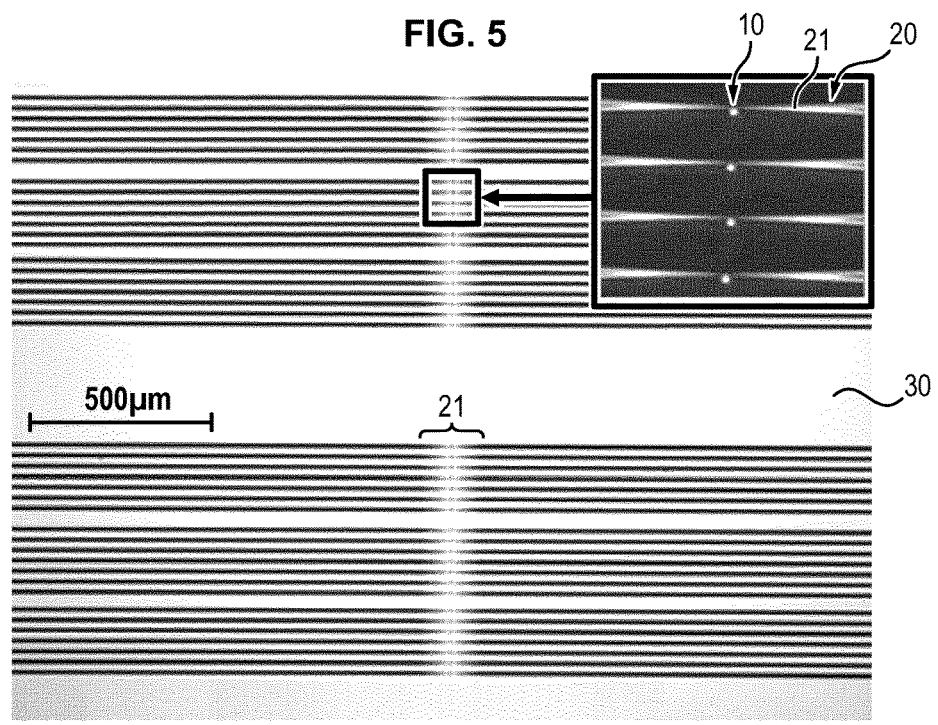

On FIG. 5 is represented a plurality of resonators 10 and waveguides 20 on the sample substrate 30. There is only one resonator 10 per waveguide 20.

Figure 6:
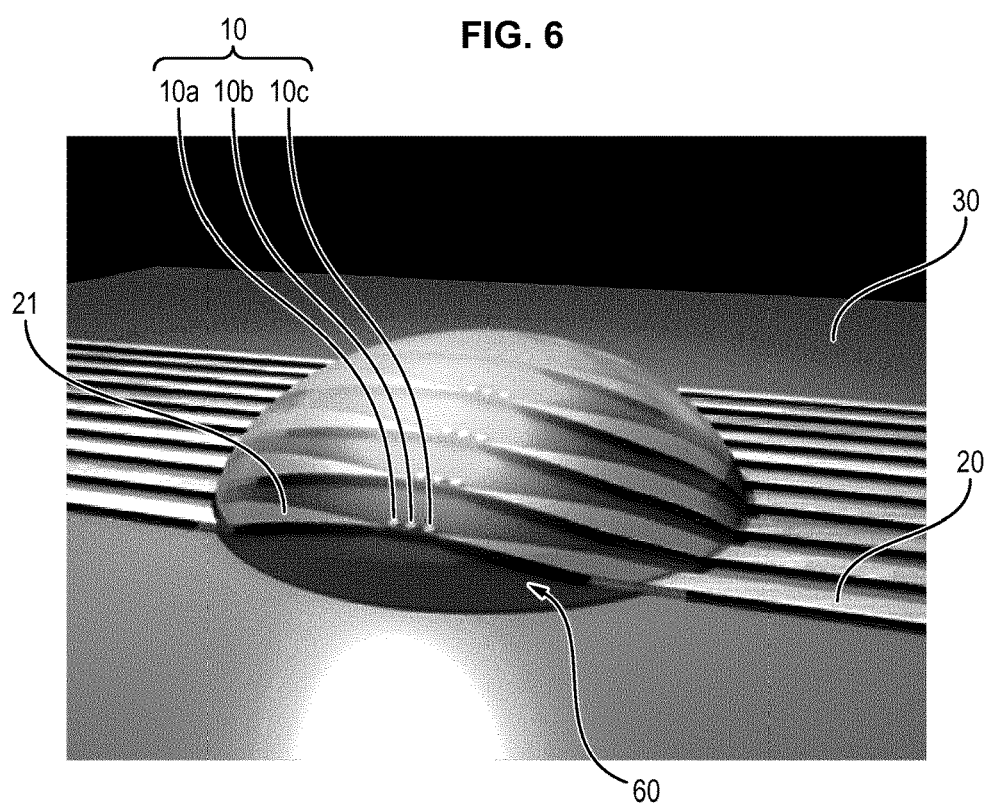

On FIG. 6 is represented a collective architecture of resonators 10 and waveguides 20 on the sample substrate. As it can be observed, three resonators 10a, 10b, 10c are located in the tapered central region 21 of each waveguide 20, said three resonators 10 being thus optically fed by the same waveguide 20.

For a typical optical tuning application, each resonator 10 has its resonance wavelengths $\lambda r$, which are to be tuned at a targeted resonance wavelength $\lambda t$. Each resonance wavelength $\lambda r$ depends on the dimension of the resonator 10. In the present case, we remind that each resonator 10 has in fact two resonance wavelengths $\lambda r$ corresponding to the doublet, but as the two values are bound, we can refer to a single one.

The method for tuning resonator(s) relies upon photoelectrochemical (PEC) etching. PEC is a light activated chemical etching.

To enable such an etching, the resonator 10 has to be immersed in a fluid 60 containing ions (see FIG. 6).

Figure 7:
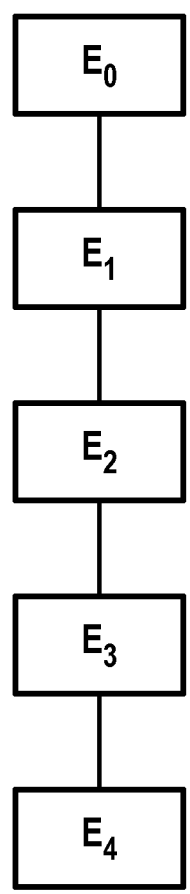

Method for Tuning an Optical Resonator (FIG. 7)

First of all, the photonic device, in particular the resonators 10a, 10b are immersed in the fluid 60 containing ions. A preliminary step E0 is thus to deposit a droplet of said fluid 60 onto the resonator 10, or more generally to immerse resonators in the said fluid. The resonators 10 are thus surrounded by said fluid 60.

The method comprises a step of injecting light into the resonator 10 at the resonance, that is to say the wavelength $\lambda$ of the injected light is equal or sensibly equal to the resonator wavelength $\lambda r$, such that the injected light $\lambda$ resonates within the resonator 10 and triggers a photoelectrochemical (PEC) process.

As it will be explained below, the resonance amplifies light intensity in the resonator 10 and in particular in the disk 11, hereby enhancing the etching process.

The presence of surrounding fluid 60 containing ions enables such process.

Thus, as the disk is etched, its dimensions decrease, hereby lowering the resonance wavelength $\lambda r$ of the resonator 10.

When no more light is injected, the etching process stops.

The previous step is part of the following ones:
Starting the step E1 of injecting the light,
Adjusting E2 the light wavelength $\lambda$ of the injected light so as to attain the resonance wavelength $\lambda r$ of the resonator 10,
Lowering E3 the light wavelength $\lambda$ so as to follow the resonance wavelength $\lambda r$ during the etching process until a targeted resonance $\lambda t$ wavelength is reached,
Stopping E4 the light injection at the targeted resonance wavelength $\lambda t$.

Preferred Embodiment of the Method

In a preferred embodiment, the wavelength $\lambda$ of the injected light is above the resonator bandgap wavelength lambda_B. This means that the light energy is below the bandgap energy of the material.

Indeed, standard PEC etching technique consists in illuminating a semiconductor immersed in an electrically conductive liquid, such as the fluid 60 containing ions, with light whose energy is above the bandgap. This generates electrons and holes within the material and these photogenerated free carriers lead to the formation of ionic species at the surface of the semiconductor that are dissolved in the presence of ions provided by the fluid 60.

In GaAs this process is described by the following chemical reaction:

Absorption of light generates electron and holes,

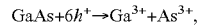
$GaAs + 6h^+ \rightarrow Ga^{3+} + As^{3+}$,

The generated ions are dissolved in the surrounding fluid 60, terminating the etching.

In standard PEC technique, UV light, that is to say light with a wavelength below 400 nm, is often used because it is absorbed by the semi-conductor thanks to its energy above the energy bandgap of the resonator. In some cases, visible light with energy above the bandgap can be used as well. The optical absorption, coupled to the presence of ions in the fluid 60, leads to the etching of the semiconductor material.

In the preferred embodiment described here, light whose wavelength $\lambda$ is above the wavelength bandgap lambda B (i.e. light whose energy is below the energy bandgap) is used. Infrared light is preferably used (light wavelength above 800 nanometers), but visible light (light wavelength between 400 and 800 nanometers) can be used as well, depending on the characteristics of the material of the resonator(s) to be etched and tuned.

Semi-conductor resonator 10, in the present case GaAs disk 11, absorbs a residual fraction of the confined infrared light even at energy below the energy bandgap due to various mechanisms.

Among those mechanisms are mid-gap levels present at the semi-conductor surface, as well as two-photon absorption at higher light intensity.

Therefore, by using light wavelength above the bandgap wavelength, light can be injected and highly intensity-amplified within the resonator 10 thanks to the resonance. The circulating power in the disk is enhanced over the power circulating in the waveguide by a factor proportional to the resonator finesse, which in these devices is of the order of 1000. The resonance increases the intensity of the injected light at the level of the resonator 10 and enables the etching process described above, even though the injected light wavelength λ has its energy below the energy bandgap of the material. Indeed, the etching process is enabled thanks to the resonance of the resonator 10.

This directly leads to a high selectivity in etching only the resonator 10, where the light intensity is enhanced at most, over the surroundings (waveguide 20, substrate 30). Besides, the technique provides both an extremely high control in the etch speed and the possibility to monitor in real time with high spatial and spectral resolution.

Figure 8:
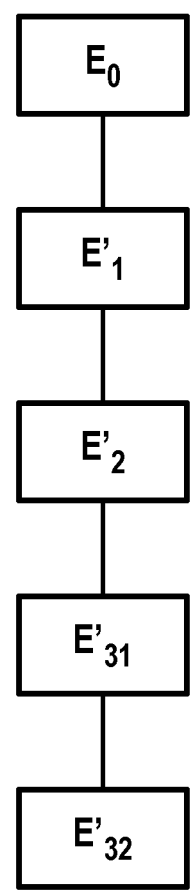
Figure 11A:
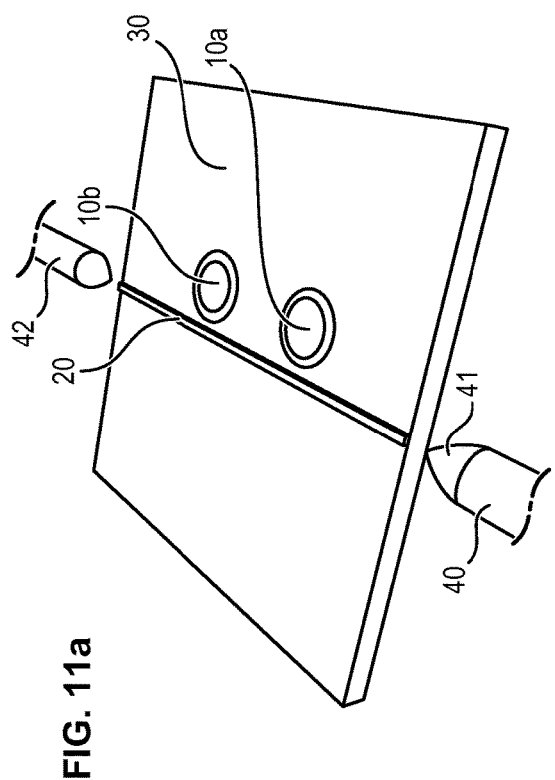
Figure 11B:
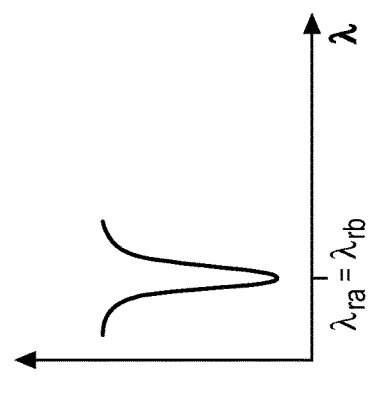

Method for Tuning Several Resonators at a Targeted Value (FIG. 8)

A second aspect of the method is to tune several resonators 10a, 10b, 10c at a common targeted wavelength λt. The resonators 10a, 10b, 10c are typically coupled to a waveguide 20 (see FIG. 6 for instance)

FIGS. 9a to 11b show the principle of the method applied to a plurality of resonators. After micro-nanofabrication, the photonic resonators 10a, 10b have different size due to fabrication variability (see FIG. 9a), and therefore express different resonance wavelength λra and λrb (see FIG. 9b), one being higher than the other one (for instance in this example resonator 10b is initially slightly larger than resonator 10a, hence λrb>λra).

This method is based on the first method previously described, that is to say a photoelectrical etching process triggered by optical resonance and a progressive decrease of the injected light wavelength λ so as to shift the resonance wavelength λr to the targeted wavelength λt.

The photonic device, in particular the resonators 10a and 10b, are immersed in the fluid 60 containing ions (see FIG. 10a). The same preliminary step E0 (deposit a droplet of said fluid onto the resonator 10, or more generally immersing in the ionic fluid) is achieved.

The next step consists in setting (E1') a light wavelength λ of the injected light to a value larger than the resonance wavelengths λra, λrb of the resonators 10.

In a similar way as before, the laser source 40 is coupled to the waveguide 20.

Then, the light wavelength λ is lowered (E2') so as to reach the first resonance wavelength λrb of the photonic resonator 10b. The etching process starts on this latter resonator. Due to the site-specific character of the method, the other resonator 10a, whose resonance wavelength λra is lower, is not etched and remains intact.

Indeed, the injected light naturally enters first the resonance of resonator 10b and shifts its resonance wavelength λrb towards lower values (see arrow in FIG. 10b).

The next step consists in lowering (E31') the wavelength λ of the injected light, so as to follow resonance wavelength λrb of the resonator 10b, which is decreasing because of the etching. The wavelength λ is lowered until the resonance wavelength λrb of the resonator 10b reaches the resonance wavelength λra of the other resonator 10a (see FIGS. 11a, 11b).

Once it is achieved, both resonators 10a, 10b share a common resonance wavelength and the same dimensions, meaning that they are tuned.

The process can be completed by lowering (E32') again the wavelength λ of the injected light, which triggers the etching of both photonic resonators 10a, 10b at the same time and the same speed. It is therefore possible to reach the targeted resonance wavelength λt for both resonators 10a, 10b.

Indeed, when the two resonances overlap, any further decrease of the injected light wavelength λ simultaneously etches both resonators 10a, 10b and maintains them with exactly the same effective dimensions and optical resonance values.

This method can be applied for tuning any number of resonators 10 coupled to a waveguide 20, as long as the value of the wavelength λ of the injected light is above the highest resonance value λr of said resonators. Note that the order in which the resonators 10 are positioned along the waveguide (for example with the largest resonator first, last or in the middle) is not important, thanks to the wavelength selective nature of the tuning.

Figure 12:
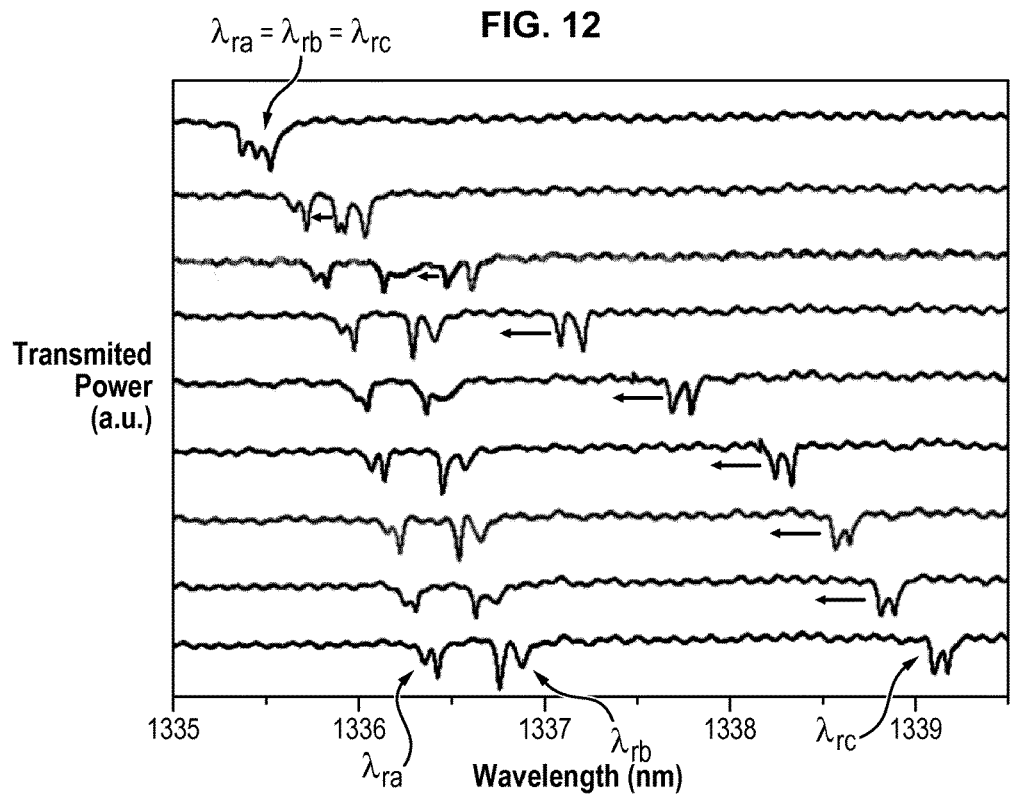

FIG. 12 shows the spectrum of resonance of resonators 10a, 10b, 10c being tuned. Each resonator 10 is associated to a resonant doublet. For clarity reason, we will refer to a single value of resonance λra, λrb, λrc for each resonator 10.

As it can be observed in curve 1 of FIG. 12, the three resonators 10 have distinct resonance wavelengths λra<λrb<λrc. Thanks to the etching, those wavelengths have been grouped (see the evolution in curves 2 to 9) λra=λrb=λrc.

Figure 13:
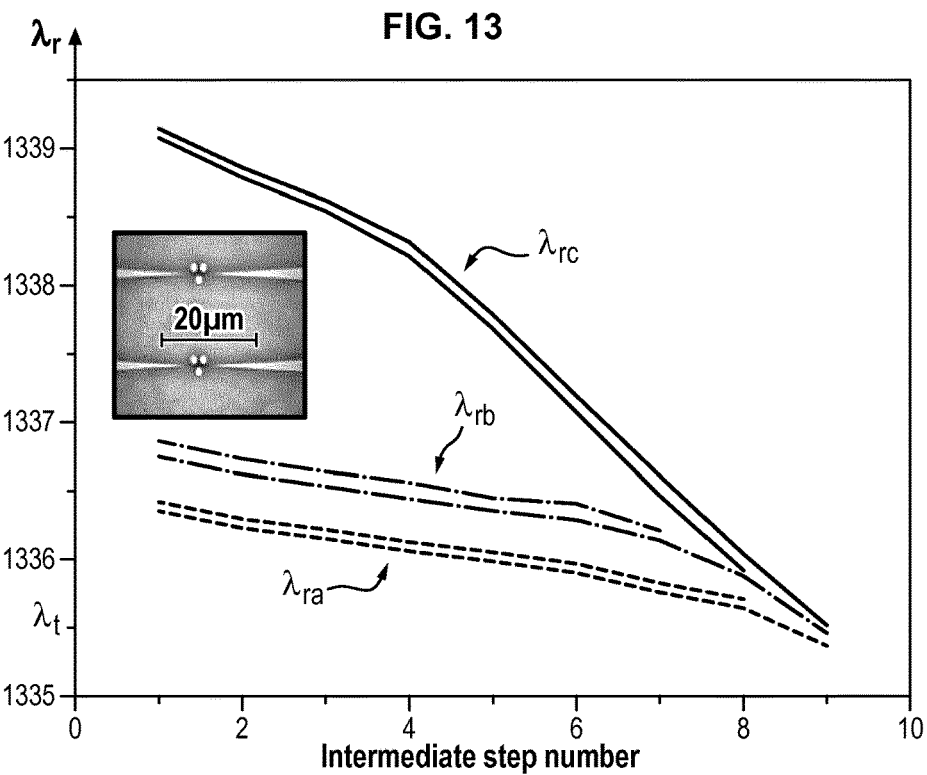

FIG. 13 shows the convergence of said resonant doublet wavelength towards a unique value, which is the targeted wavelength λt (again, the two close curves represent the resonant doublet).

Different Embodiments for Varying the Laser Wavelength in Order to Tune Optical Resonators Different techniques have been employed to vary the laser source wavelength λ in order to control the tuning method. A first one is using discrete sweeps, and a second one is using a continuous shift.

The first technique for tuning at a targeted wavelength λt with successive sweeps of laser λ can be the following one:
Lowering the resonance wavelength λr of the photonic resonator 10 by consecutive sweeps, each sweep consisting in sweeping the injected laser light wavelength λ over a range that contains the resonance wavelength λr of the photonic resonator 10, thereby at each sweep injecting short bursts of light (with a fixed amount of energy depending on the sweep speed) into the resonator 10.

Instead of using discrete successive sweeps, the second technique for tuning at a targeted wavelength λt can use a continuous shift of the laser source wavelength λ. In this respect, a laser source 40 must be chosen whose wavelength is continuously adjustable.

The process consists in a unique and slow sweep.

A control unit 50 can be connected to the laser source 40 so as to control the wavelength of the laser source 40 in order to precisely follow the resonance wavelength λr.

The adjustment of the light wavelength typically consists in lowering the wavelength λ, as long as the starting wavelength has been chosen above the highest resonance wavelength λr of the resonators 10.

Those two techniques apply for tuning one resonator 10 as well as for tuning several resonators 10a, 10b, 10c, or more.

Parameters and Experimental Data

Fluid

The fluid 60 is typically deposited as a microliter droplet of water on the sample substrate with a micro-pipette. This droplet covers several adjacent resonator and waveguides (see FIG. 6, 10a). Besides, such a fluid 60 leaves the overall optical transmission through waveguides unaltered in average power.

The fluid 60 can be, as non-limitative example, a liquid containing a few ions, such as deionized water or ammoniac, or a gas containing ions, such as a chemical vapor or steam.

In case the fluid is ambient air or a controlled humid atmosphere or a gas containing ions, the photo-assisted etching becomes slower and the precision of the tuning can be made larger.

When the resonator material is silicon, the fluid 60 can be a fluor-based liquid or gas.

When the resonator material is gallium-based, the fluid 60 can be water, ambient air or a controlled humid atmosphere.

In order to be efficient, the fluid 60 must have a non-zero conductivity, that is to say an ability to conduct an electric current. As explained below, the value of said conductivity is not of a major importance.

Several experiments (not reported here) have been run with higher conductivity liquids to non-conductive ones. By reducing by orders of magnitude the conductivity of the liquid 60, the etching process is completely suppressed due to the absence of ions. Conversely the etching speed is not highly modified if the concentration of ions is increased. Those experiments suggest that the etching rate is limited by the electrons and holes generation in the disk 11, and not by the dissolution of the ionic compounds in the liquid 60.

The fluid 60, especially in the case of a liquid, can be easily removed after the tuning procedure by blowing air or nitrogen, without any damage to the photonic device.

Material and Resonator Geometry

The resonant PEC tuning of optical resonators is not restricted to GaAs resonators shown above as example. Indeed the PEC process operates on all semiconductor materials in the standard configuration of light wavelength $\lambda$ below the material bandgap wavelength lambda B. Hence the technique presented here of PEC-assisted optical tuning applies to optical resonators fabricated out of any semiconductor material, with the specificity of now having the laser light wavelength $\lambda$ larger than the bandgap wavelength lambda B.

The technique extends as well to dielectric optical resonators, even if PEC processes are less trivial to use in such materials, because of constraints due to the high bandgap energy of these materials.

The technique also operates on different geometries of optical resonators, and not only on disk resonators sustaining WGMs like discussed above. Of technological relevance are photonic crystal micro and nano-resonators, race-track and ring optical resonators, plasmonic resonators, Fabry-Perot resonators, Bragg mirror resonators and distributed feedback grating resonators. Any micro or nano-optical resonator providing optical resonance, with the associated light confinement and amplification, is suited for the technique.

Note that the photonic resonator illustrated on FIG. 2 is also a mechanical resonator.

This invention can thus be generalized to all mechanical resonators whose mechanical resonant frequencies can be tuned by the method, provided these mechanical resonators are functionalized for being photonic resonators as well. This invention can hence be used for realizing MEMS devices with targeted mechanical resonant frequencies, with a superior precision (mechanical resonators trimming).

Sweeping Rate

In an experiment, the injected light has been injected discontinuously, by sweeping the laser source 40 several times back and forth across one optical resonance of the resonator 10. This way, at each sweep, a small and reproducible amount of energy was injected inside the resonator 10 (nano Joule range).

Figure 14:
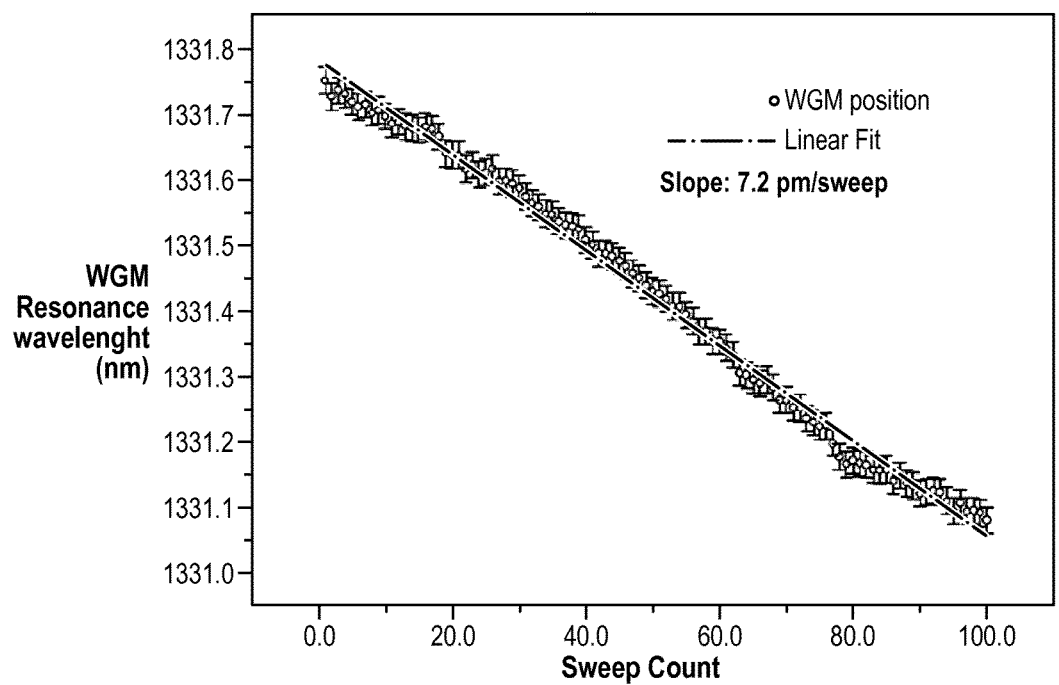
FIG. 14 shows the Whispering Gallery Mode (WGM) resonance wavelength as a function of the sweep count.

In FIG. 14 the WGM resonance wavelength $\lambda r$ has been represented as a function of the sweep count. The power of the laser source 40 was low, at 0.2 mW at the display of the laser source controller.

It has been estimated that a rate of 7 pm per round-trip sweep, i.e. 3.5 pm per single sweep has been achieved. This corresponds to the removal of the order of $10^{-2}$ monolayer of material per sweep (for instance, one monolayer of GaAs is approximately 300 pm). The error bar represents the 20 pm relative wavelength accuracy of the employed laser source 40 over repeated wavelength sweeps.

Etching and Laser Source Power

Figure 15:
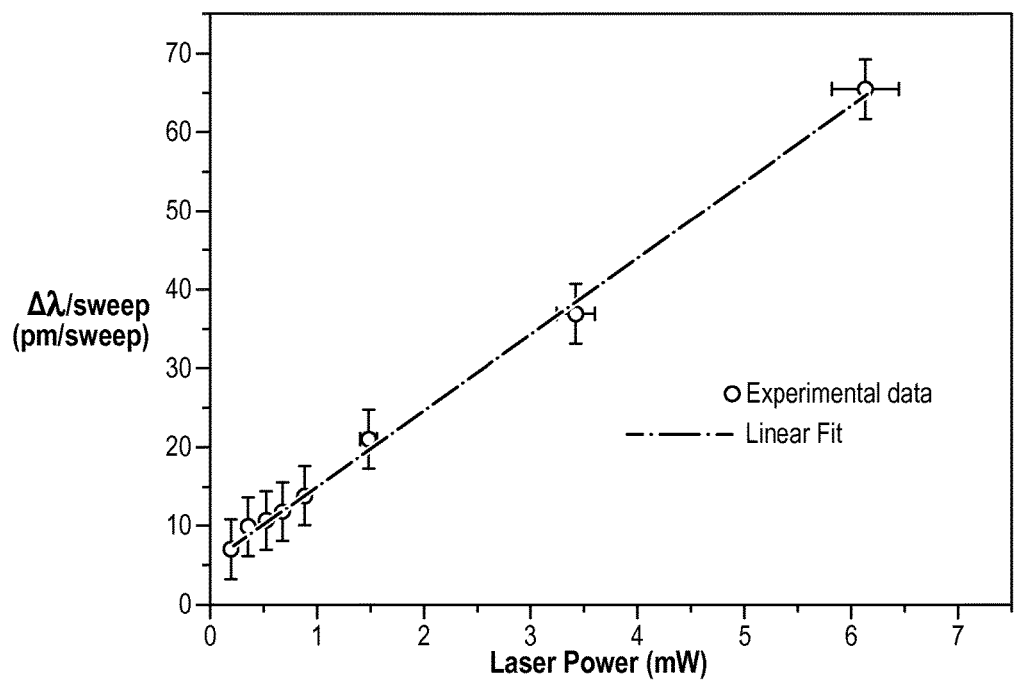
FIG. 15 shows the wavelength shift per sweep as a function of laser power.

In FIG. 15, the wavelength shift per sweep has been represented as a function of the laser power. A linear dependence can be observed; therefore the etching speed can be precisely controlled by controlling the power of the laser source 40.

Several orders of magnitude in the etching speed are possible.

Characteristics of the Tuned Optical Resonator

When tuning a resonator, it is crucial to check that no degradation occurs, especially when a significant amount of material is removed.

Figure 16:
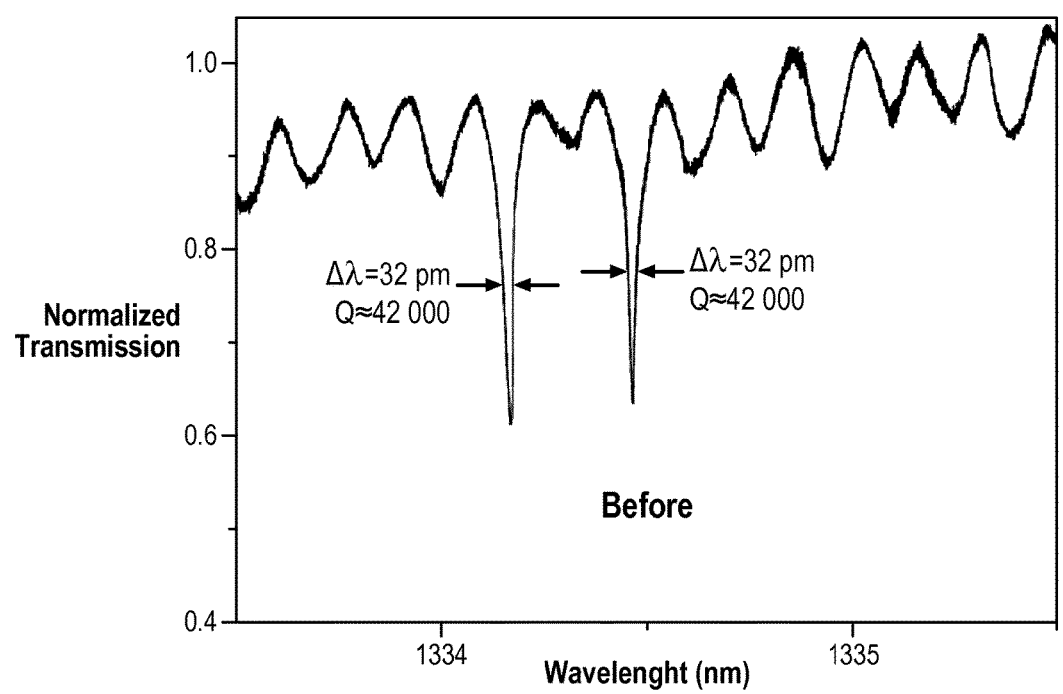
FIG. 16 shows the spectrum the resonator before tuning.
Figure 17:
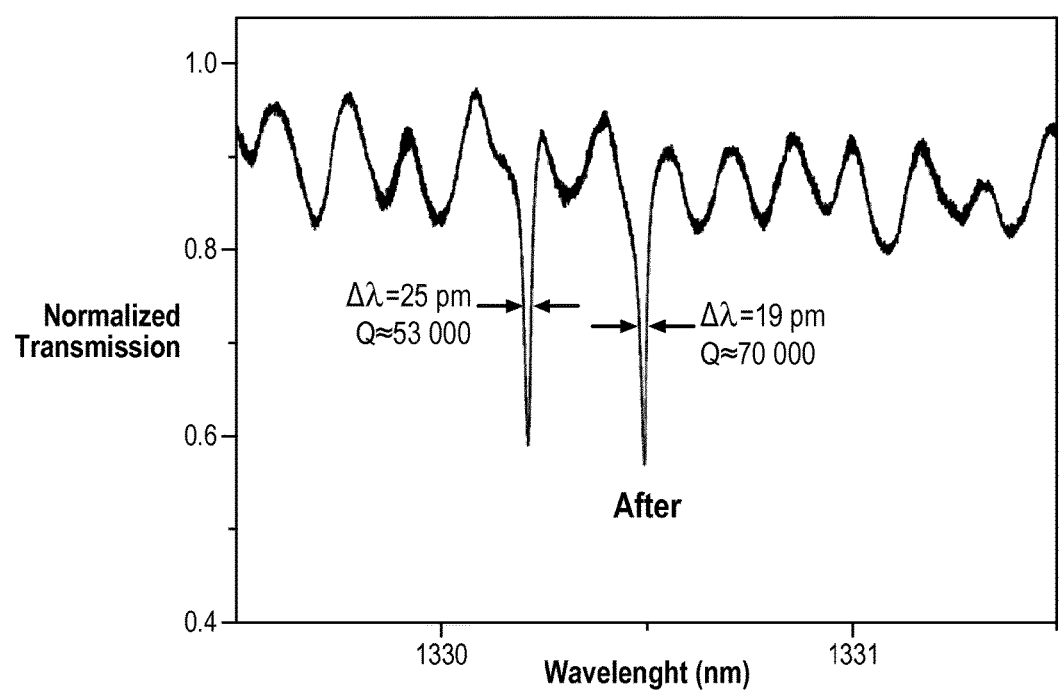
FIG. 17 shows the spectrum of the resonator after tuning.

The spectrums (measured in air) of a resonator 10 in FIGS. 16 (before tuning) and 17 (after tuning) show an optical resonance doublet corresponding to the fine structure of each resonator 10. This is partly due to the fact that the disk is not perfectly round-shaped. Between spectrum of FIG. 16 and the one of FIG. 17, a shift in the resonance wavelengths $\lambda r$ is observed (around 4 nm), corresponding to the result of the etching process. But the quality factors of the doublet of resonator 10 before the tuning are around 42 000/42 000 ($\lambda r \approx 1334$ nm and $\Delta\lambda \approx 32$ pm for both dips of the doublet) and the quality factors afterwards are around 53 000/70 000 ($\lambda r \approx 1330$ nm and $\Delta\lambda \approx 25$ pm and 19 pm for the dips of the doublet). As a result, it turns out that the method does not damage the properties of the resonators 10, and would even improve their optical quality factor Q.

It is important to note that after the tuning procedure, the resonators are permanently tuned, even when the tuning laser is switched off and the fluid removed.

The photonic devices, especially the resonators 10, are thus permanently tuned with an error on the dimensions inferior to 10 pm. This means that, for each resonator, an absolute precision better than 10 pm can be reached. For several resonators, a relative precision of few tens of pm is demonstrated and better than 10 pm can be reached.

In other words, the resonators are tuned collectively at the same value, which is a common targeted resonance wavelength value $\lambda t$, with a resonance wavelength (lambda $\lambda i$) of each resonator i conforming to the targeted resonance wavelength value $\lambda t$ with a precision better than 10 pm.

In the experimental results shown in this document, this precision level of 10 pm is set by the finite wavelength precision of the employed laser. Finer precision can be reached in principle. For instance, precision inferior to 10 pm or even 1 pm can be reached. The rate of the etching is a condition for such precision. As an illustration, when the fluid is ambient air, the etching rate is largely decreased, and the wavelength error can fall below 1 pm between the wavelength of each resonator and the targeted resonance wavelength value.

The same precision is also found for the value of the optical resonance wavelength. These tuning precisions are given here for the specific GaAs disk resonators presented above, but finer spectral precision can be reached by resonators of larger dimensions or by employing a more stable laser source for controlling the etching.

The methods presented here allows for three orders of magnitude higher precision over prior art, both in controlling the effective optical device size and in its spectral optical resonance, reaching picometer precision for these two aspects.

As the etching is triggered when the optical resonance is reached, the methods provide a high spatial selectivity: the resonator 10 is selectively etched while its nearby environment, such as the waveguide 20, the substrate 30, or other resonator of different resonance wavelength remain intact.

By adjusting the etching rate (with laser source intensity for example) and spectrally monitoring the etch progress, a high quality factor resonator 10 can be tuned to resonance with a high precision. Similarly, several resonators of high quality factor Q can be tuned to resonance as well. Thanks to the scalability of the method, hundreds of resonators can be rapidly tuned using a single sweep of laser wavelength $\lambda$.

Indeed, as described above, there is no need to identify and to act individually on each resonator; instead, the method automatically brings optical resonances at a common targeted wavelength $\lambda t$, with a precision less that 10 pm.

It is therefore now possible to manufacture networks or arrays of high quality factor optical resonators, which are resonantly coupled.

Amongst the resonators 10 that can be tuned with those methods, one can cite photonic crystal resonators, Bragg resonators or plasmonic resonators.

The resonator 10, the waveguide 20 and the substrate 30 can be also made of Silicon, or any other semi-conductor or dielectric material with a bandgap where photoelectrochemical (PEC) etching operates.

The invention claimed is:

1. Method for tuning at a targeted resonance wavelength ($\lambda t$) at least one micro and/or nanophotonic resonator,
   the resonator having dimensions defining resonance wavelength ($\lambda r$) of said resonator,
   the resonator being immersed in a fluid containing ions so that the resonator is surrounded by said fluid,
   wherein the method comprises a step of injecting light, having a light wavelength equal to the resonance wavelength ($\lambda r$), into the resonator,
   so that the injected light ($\lambda$) resonates within the resonator and triggers a photo-electrochemical etching process enabled by the surrounding fluid containing ions, said etching process being enhanced by the optical resonance which amplifies light intensity in the photonic resonator,
   the etching decreasing dimensions of the photonic resonator, hereby lowering and tuning the resonance wavelength ($\lambda r$) of the photonic resonator.

2. Method according to claim 1, wherein the photonic resonator has a bandgap wavelength (lambda B) set by its constitutive material and the wavelength ($\lambda$) of the injected light is above the resonator bandgap wavelength (lambda B).

3. Method according to any one of claims 1 to 2, wherein the injected light is monochromatic.

4. Method according to claim 1, comprising the steps of:
   Starting the step (E1) of injecting the light,
   Adjusting (E2) the light wavelength ($\lambda$) of the injected light so as to attain the resonance wavelength ($\lambda r$) of the resonator,
   Lowering (E3) the light wavelength ($\lambda$) so as to follow the resonance wavelength ($\lambda r$) during the etching process until a targeted resonance ($\lambda t$) wavelength is reached,
   Stopping the light injection at the targeted resonance wavelength ($\lambda t$).

5. Method according to claim 4, wherein the tuning procedure consists in lowering (E2) the resonance wavelength ($\lambda r$) of the photonic resonator (10) by consecutive sweeps, each sweep consisting in sweeping the light wavelength ($\lambda$) of the injected light between values which comprise the resonance wavelength ($\lambda r$) of the photonic resonator.

6. Method according to claim 1, wherein the step of injecting light is realized by far-field or near-field optical coupling technique, and where light is injected into one or several resonators.

7. Method according to claim 1, wherein the light wavelength ($\lambda$) of the injected light is comprised amongst visible and infrared spectrum.

8. Method according to claim 6, wherein the coupling between the photonic resonator and an optical waveguide placed in the resonator's vicinity is achieved by evanescent waves.

9. Method according to claim 1, wherein the fluid is a liquid containing ions.

10. Method according to claim 1, wherein the fluid is ambient air or a controlled humid atmosphere or a gas containing ions.

11. Method according to claim 1, wherein the resonator material is silicon and the fluid is a fluor-based liquid or gas.

12. Method according to claim 1, wherein the resonator material is gallium-based and the fluid is water, ambient air or a controlled humid atmosphere.

13. Method according to claim 1, for tuning two photonic resonators (10a, 10b), each one having a different resonance wavelength ($\lambda ra$, $\lambda rb$), the method comprising the following steps:
   Setting (E1') a light wavelength ($\lambda$) of the injected light to a value larger than the resonance wavelength ($\lambda ra$, $\lambda rb$) of either resonator,
   Lowering (E2') light wavelength of the injected light so as to attain a first resonance wavelength ($\lambda rb$) of a first photonic resonator and start the etching process, while a second photonic resonator having a second resonance wavelength ($\lambda ra$) inferior to the first resonance wavelength ($\lambda rb$) remains intact,
   Lowering (E31') light wavelength ($\lambda$) of the injected light so as to follow the first resonance wavelength ($\lambda rb$), which decreases until the first resonance wavelength ($\lambda rb$) of the first photonic resonator that is being etched overlaps with the resonance ($\lambda ra$) of the second photonic resonator, the photonic resonators being hereby tuned.

14. Method according to claim 13, comprising the following step of lowering (E32') light wavelength ($\lambda$) so as to etch both photonic resonators at the same time and the same rate, such that both photonic resonators can be tuned at a common targeted resonance wavelength value ($\lambda t$) and have the same dimensions and optical resonance wavelength.

15. Method according to claim 1, wherein each photonic resonator is a disk, a photonic crystal resonator, a ring or racetrack resonator, a Bragg resonator, a distributed feedback grating resonator, a Fabry-Perot resonator or a plasmonic resonator.

16. Method according to claim 1, wherein the photonic resonator and the substrate are made of GaAs, Silicon, and/or any other semi-conductor and dielectric material where photoelectrochemical etching operates.

17. Method according to claim 1, wherein the photonic resonator is also a mechanical resonator, whose mechanical resonant frequencies can be tuned by the method.

18. Photonic device with several photonic resonators on a substrate, obtainable by a method according to claim 1, all resonators being tuned to a common targeted resonance wavelength value (λt), with a wavelength error for each resonance wavelength (λi) of each photonic resonator (i) relative to the common targeted resonance wavelength value (λt) which is inferior to 100 pm.

19. Photonic device with several photonic resonators according to claim 18, all resonators being tuned to a common targeted resonance wavelength value (λt), with a wavelength error for each resonance wavelength (λi) of each photonic resonator (i) relative to the common targeted resonance wavelength value (λt) which is inferior to 10 pm.

20. Photonic device with several photonic resonators (10) according to claim 18, all resonators being tuned to a common targeted resonance wavelength value (λt), with a wavelength error for each resonance wavelength (λi) of each photonic resonator (i) relative to the common targeted resonance wavelength value (λt) which is inferior to 1 pm.

21. Photonic device according to claim 18, comprising a waveguide which enables transmission of the light to each photonic resonator, by being on the substrate in the vicinity of the at least one resonator.

22. Photonic device according to claim 18, wherein each photonic resonator is a disk, a photonic crystal resonator, a ring or racetrack resonator, a Bragg resonator, a distributed feedback grating resonator, a Fabry-Perot resonator or a plasmonic resonator.

23. Photonic device according to claim 18, wherein the photonic resonator is also a mechanical resonator, whose mechanical resonant frequencies can be tuned by a method according to claim 1.

24. Photonic device according to claim 18, wherein the photonic resonator and the substrate are made of GaAs, Silicon, and/or any other semi-conductor and dielectric material where photoelectrochemical etching operates.

* * * * *